United States Patent [19]

Baker

[11] 4,421,819
[45] Dec. 20, 1983

[54] WEAR RESISTANT PAPER MACHINE FABRIC

[75] Inventor: Samuel M. Baker, Carleton Pl., Canada

[73] Assignee: JWI Ltd., Ontario, Canada

[21] Appl. No.: 430,698

[22] Filed: Sep. 30, 1982

Related U.S. Application Data

[63] Continuation-in-part of Ser. No. 351,492, Feb. 23, 1982, abandoned.

[51] Int. Cl.³ .................... B01D 39/08; D03D 15/00; D03D 15/12; D21F 7/08
[52] U.S. Cl. .................... 428/229; 139/383 A; 139/420 A; 162/358; 162/DIG. 1; 428/373; 428/394
[58] Field of Search .................... 428/229, 373, 394; 139/383 A, 420 A; 162/358, DIG. 1

[56] References Cited

U.S. PATENT DOCUMENTS

| | | | |
|---|---|---|---|
| 3,158,984 | 12/1964 | Butler | 162/DIG. 1 |
| 4,041,989 | 8/1977 | Johansson | 139/383 A |
| 4,093,512 | 6/1978 | Fleischer | 139/383 A |
| 4,184,519 | 1/1980 | McDonald et al. | 139/383 A |
| 4,259,394 | 3/1981 | Khan | 139/383 A |
| 4,276,348 | 6/1981 | Wu et al. | 428/373 |
| 4,281,688 | 2/1982 | Kelly et al. | 139/383 A |
| 4,289,173 | 9/1981 | Miller | 139/420 A |
| 4,297,414 | 10/1981 | Matsumoto | 428/399 |
| 4,314,589 | 9/1982 | Buchanan et al. | 162/DIG. 1 |
| 4,350,731 | 9/1982 | Siraeusano | 162/DIG. 1 |

FOREIGN PATENT DOCUMENTS 2810429 9/1978 Fed. Rep. of Germany ...... 428/373

Primary Examiner—James C. Cannon
Attorney, Agent, or Firm—Oblon, Fisher, Spivak, McClelland & Maier

[57] ABSTRACT

A heat set paper machine fabric having at least a portion of its wear resisting surface composed of cross-linked high density high molecular weight polyethylene.

5 Claims, 6 Drawing Figures

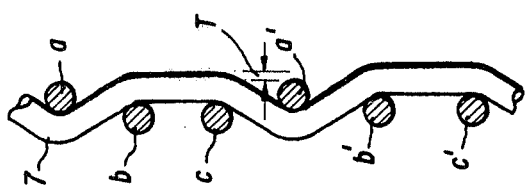
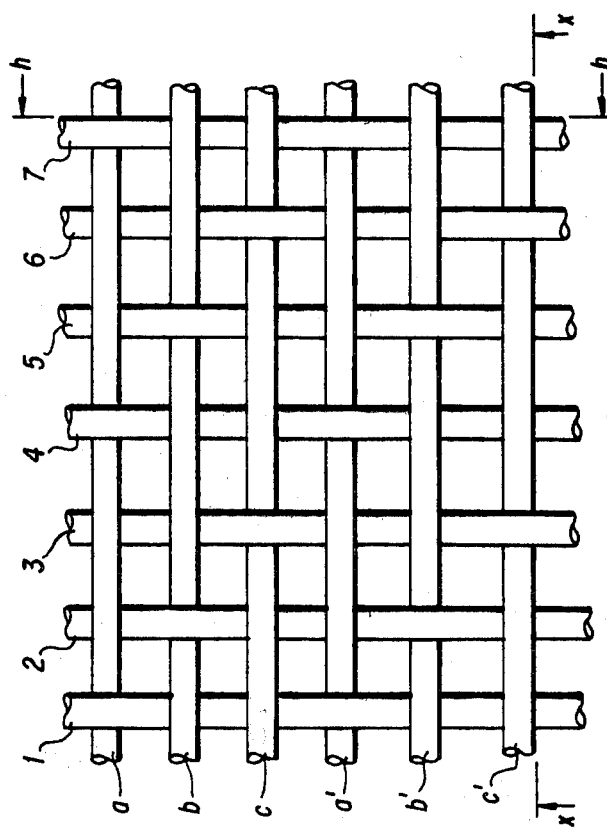
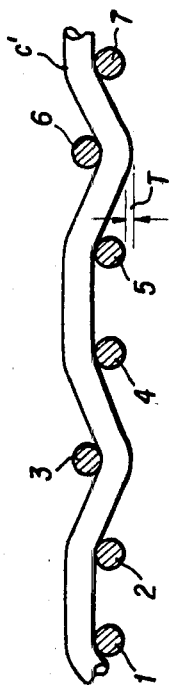

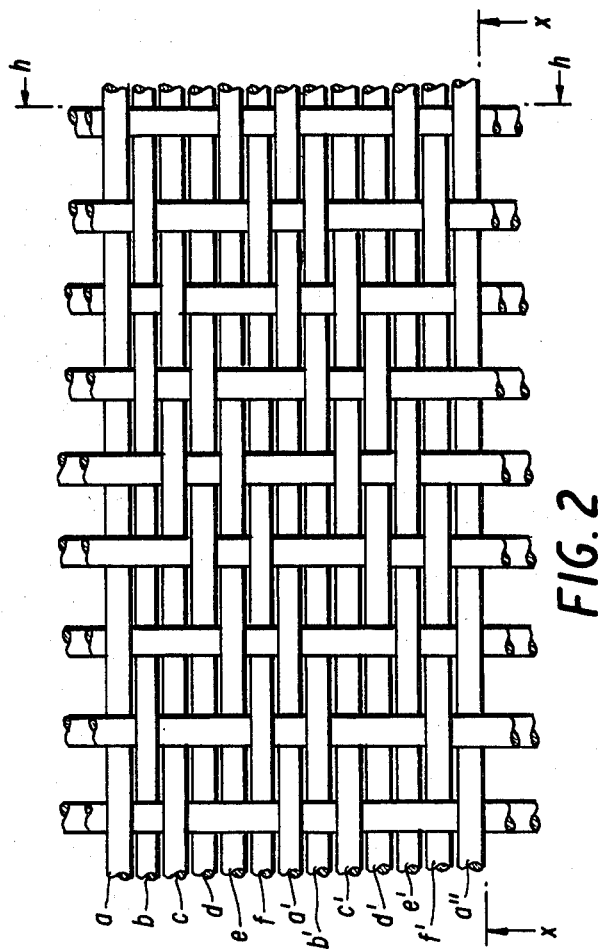
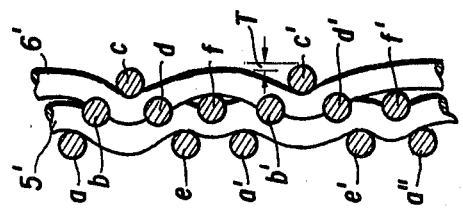
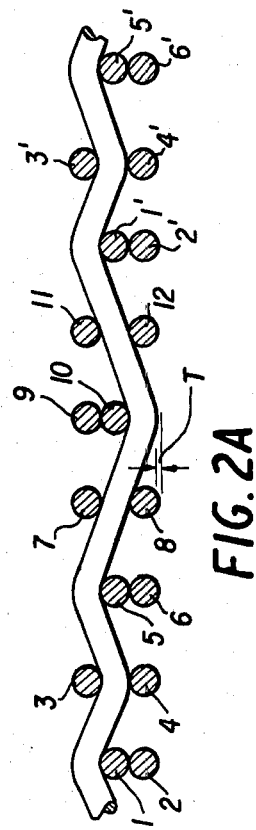

WEAR RESISTANT PAPER MACHINE FABRIC

This application is a continuation-in-part of U.S. application Ser. No. 351,492, filed Feb. 23, 1982, and now abandoned.

BACKGROUND OF INVENTION (a) Field of the Invention

This invention relates to paper machine clothing such as forming fabrics, press felts and dryer fabrics which are woven of plastic polymeric yarns. More particularly the invention relates to providing a fabric having superior wear resistance.

(b) Description of Prior Art

Paper machine clothing is provided in the form of endless belts which run over supporting rolls and carry the web of wet pulp or paper through the machine. For example, an aqueous suspension of cellulose fibers, comprising one part or less fibers in 99 parts or more of water by weight, is flowed on to an endless rotating fabric. This fabric may be woven of multifilament or monofilament synthetic strands, in single layer or in multi-layer structures, that provide support for the fibers of pulp and at the same time uniform and adequate drainage. As this belt, or forming fabric, as it is called, passes over water extraction devices such as table rolls, drainage foils and suction boxes, the water content of the suspension supported on the fabric is reduced to about 80 to 85 percent.

The thin web of fibers, now self supporting, is removed from the forming fabric and passes to a series of one or more press sections where it is deposited on other endless belts of relatively thick fabric, one or both surfaces of which may be composed of a batt of synthetic or natural fibers needled to a backing of woven plastic yarn. These press felts, as they are called, carry the web of paper through the nips of press rolls where more of the water remaining in the web is squeezed into the absorbent felts until the water content is lowered to about 60%. At this point it is not generally practical to attempt further water removal by direct extraction such as with vacuum or pressure.

The web of paper is then passed to the dryer section of the machine where the remainder of the water is removed by an evaporation process accelerated by the application of heat. In the dryer section there are a number of large, hollow cast iron or steel cylinders over which the paper web passes in serpentine fashion. The cylinders are rotated synchronously to facilitate the passage of the web and are heated by steam condensing within. The web of paper is held in intimate contact with portions of the heated surfaces of the cylinders by dryer fabrics. Dryer fabrics may be woven of synthetic yarns in simple or in very complex weaves generally in two or more layers to form a comparatively impermeable fabric.

For each of these uses the paper machine fabrics must be structurally stable in the plane of the cloth, flexible in at least the machine direction and have sufficient tensile strength in the machine direction to resist stretching. They must also be reasonably resistant to corrosion and the absorption of moisture and possess a surface that is resistant to abrasive wear. Abrasive wear plays an important role in determining the useful life of all paper machine clothing and this is most apparent in forming fabrics which, because they must travel in contact with various stationary dewatering elements, are the most susceptible to abrasive wear. In addition, forming fabrics are designed to remove large amounts of water while retaining the fibers in the paper web, thus they are very fine and have relatively small volumes of material available for abrasive wear. For this reason the present invention is directed particularly to forming fabrics although it will be applicable to other paper machine clothing, as well, where wear is also a factor.

In the case of forming fabrics, for example, the design of the weave pattern may be selected so as to provide a prominent knuckle in the cross-machine direction yarn, usually the weft, and at the wear side of the fabric that is presented to those elements of the paper machine upon which the fabric is in contact as it runs. In this way, the more prominent weft knuckles absorb the greater portion of the wear while the warp yarns, which lie substantially within the fabric, are protected from wear and maintain the strength of the fabric throughout its life span. This concept is known in the art and is, in fact, described in U.S. Pat. No. 4,184,519 issued to P. L. McDonald et al. and U.S. Pat. No. 4,281,688 issued to B. W. Kelly et al. both related to single layer forming fabric and in U.S. Pat. No. 4,041,989 issued to A. B. Johansson et al., related to double layer forming fabric. The use of wear resistant materials in forming fabrics is described in U.S. Pat. No. 4,289,173 issued to Terence Miller.

SUMMARY OF INVENTION

The paper machine fabric of the present invention has at least a portion of its wear resisting surface composed of cross-linked high density high molecular weight polyethylene yarns.

In the fabrication of synthetic paper machine fabrics it is customary to provide warp and weft yarns of polyester material such as polyethylene terephthalate which has high tensile strength and modulus of elasticity thereby imparting stability in the fabric to resist distortion in the plane thereof. While polyester is adequate in this respect, it is not as effective in resisting abrasive wear as other polymeric materials, thus the useful life of an all-polyester fabric is limited.

We have found that high density high molecular weight polyethylene has excellent abrasion resistance characteristics in paper machine applications such as its use in stationary dewatering devices. The abrasion resistance of said polyethylene is substantially better than other polymeric materials generally considered for use as paper machine clothing yarns (refer to Table 1).

TABLE 1

RESULTS FROM ABRASION TESTING IN A SAND SLURRY

| Material | % Weight Loss after 20 Hours |
|---|---|
| High density high mol. wt. polyethylene | 0.53 |
| Cross-linked high density high mol. wt. polyethylene | 0.52 |
| Nylon type 6 | 1.30 |
| Nylon type 6/6 | 2.71 |
| Polyester (polyethylene terephthalate) | 11.89 |

The main limitation that has prevented the use of polyethylene as a forming fabric yarn, for example, is its relative low melting point which, at about 135° C. is below the heat setting temperature required to effect crimp exchange during the manufacture of synthetic forming fabrics. The heat setting temperature required is in the range of 170° C. to 220° C. This limitation is overcome in the present invention by using a cross-linked high density high molecular weight polyethylene yarn in the forming fabric. The cross-linked high density high molecular weight polyethylene yarn does not soften to the extent that it loses its shape and dimension when exposed to the range of temperatures required in the heat setting process used for manufacturing forming fabrics.

Two types of cross-linked high density high molecular weight polyethylene yarn are considered. One is a true monofilament composed of only cross-linked high density high molecular weight polyethylene. The other type is a coating of the cross-linkable high density high molecular weight polyethylene on a substrate consisting of a monofilament, or a multifilament yarn having desirable mechanical properties. The cross-linking would be accomplished during the coating step or by post treatment. The cross-linked high density high molecular weight polyethylene coating will serve as a shield against abrasion.

According to a broad aspect of the present invention there is provided a heat set paper making fabric woven of machine direction and cross-machine direction thermoplastic polymer yarns wherein at least a portion of its wear resisting surface is composed of cross-linked high density high molecular weight polyethylene.

According to a further broad aspect of the present invention there is provided a heat set paper making fabric woven of machine direction and cross-machine direction thermoplastic polymer yarns, wherein at least some of the yarns extending in the cross-machine direction, which have prominent knuckles on the wearing surface of the fabric, are composed of cross-linked high density high molecular weight polyethylene.

Although the cross-machine yarns are usually the ones that provide the prominant knuckles on the wearing surface of the fabric, in the case of some fabric designs, machine direction yarns will have prominent knuckles on the wearing surface and it may be desirable in such cases to implement the invention to have some of the machine direction yarns composed of cross-linked high density high molecular weight polyethylene.

According to a still further broad aspect of the invention there is provided a monofilament for use in a paper making fabric said monofilament being composed of a cross-linked high density high molecular weight polyethylene.

According to a still further broad aspect of the present invention there is provided a monofilament for use in a paper making fabric, said monofilament being composed of a core material having desirable mechanical properties, said core being coated with cross-linked high density high molecular weight polyethylene.

It will be appreciated that it is within the scope of the invention to use any cross-linking agent in the said high density high molecular weight polyethylene and to effect cross-linking by any means known in the art.

BRIEF DESCRIPTION OF DRAWINGS

The preferred embodiments of the present invention will be described with reference to the examples illustrated in the accompanying drawings in which:

FIG. 1 is an enlarged view of the upper surface of a conventional single layer, semi-twill forming fabric.

FIGS. 1A and 1B are cross-section views along section lines x—x and y—y respectively of FIG. 1;

FIG. 2 is an enlarged view of the upper surface of a conventional duplex forming fabric; and FIGS. 2A and 2B are cross-section views along section lines x—x and y—y respectively of FIG. 2.

FIG. 1 shows generally a topside view of a conventional semi-twill woven synthetic fabric structure in which 1, 2, 3, etc. are weft strands, all being interwoven by warp strands a, b, c in repeat pattern a', b' and c'. Each warp strand passes over two consecutive weft strands then under the third weft strand before repeating the sequence. Similarly each weft strand passes over one warp strand and under the next two consecutive warp strands before repeating the sequence.

It will be seen in the cross-section view of FIGS. 1A and 1B that at the bottom side of the fabric, which is the side that is exposed to the most wear, the long bottom weft knuckles are depressed below the level of the knuckles of the warp strands that interweave them by an amount indicated by the reference letter T. This condition is promoted by crimp exchange during heat-setting when the fabric is subjected to tension in the warp direction which tends to straighten the warp and reduce warp crimp while forcing a deeper crimp in the weft strands. According to the present invention at least some of the weft yarns in the example are cross-linked high density high molecular weight polyethylene or a suitable core yarn coated with cross-linked high density high molecular weight polyethylene.

FIG. 2 shows generally a topside view of a conventional synthetic forming fabric in a duplex weave pattern having two layers of weft strands 1, 2, 3, 4 . . . to 12, repeating as 1', 2', 3', etc., all being interwoven with warp strands a, b, c, d, e and f, repeating as a', b', c', etc. In cross-section views 2A and 2B it will be seen that the long weft crimps on the bottom side of the fabric, which will be exposed to wear, extend below the level of the warp knuckles by an amount indicated by the letter T. Here again this condition is promoted by crimp exchange during heat setting. According to the present invention, as applied to this example of a duplex fabric, at least some of the weft yarns in the lower layer, which will be in contact with stationary dewatering elements of the paper machine, are cross-linked high density high molecular weight polyethylene or suitable core yarns coated with high density high molecular weight polyethylene.

I claim:

1. A heat set paper making fabric woven of machine direction and cross-machine direction thermoplastic polymer yarns, wherein at least a portion of its wear resisting surface is composed of cross-linked high density high molecular weight polyethylene.

2. A heat set paper making fabric woven of machine direction and cross-machine direction thermoplastic polymer yarns, wherein at least some of the yarns extending in the cross-machine direction, which have prominent knuckles on the wearing surface of the fabric, are composed of cross-linked high density high molecular weight polyethylene.

3. A paper making fabric as claimed in claim 1 or 2 wherein said cross-linked high density high molecular weight polyethylene does not soften to the extent that it loses its shape and dimension when exposed to the heat setting temperature of said fabric which lies in the range of from about 170° C. to 220° C.

4. A monofilament for use in a paper making fabric said monofilament being composed of cross-linked high density high molecular weight polyethylene.

5. A monofilament for use in a paper making fabric, said monofilament being composed of a core material having desirable mechanical properties, said core being coated with cross-linked high density high molecular weight polyethylene.

* * * * *